(12) United States Patent
Shiraishi

(10) Patent No.: US 10,495,842 B2
(45) Date of Patent: Dec. 3, 2019

(54) LENS BARREL

(71) Applicant: CANON KABUSHIKI KAISHA, Tokyo (JP)

(72) Inventor: Daisuke Shiraishi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 12 days.

(21) Appl. No.: 15/839,930

(22) Filed: Dec. 13, 2017

(65) Prior Publication Data

US 2018/0180837 A1    Jun. 28, 2018

(30) Foreign Application Priority Data

Dec. 22, 2016 (JP) ................. 2016-248675

(51) Int. Cl.
*G02B 7/09* (2006.01)
*G02B 7/10* (2006.01)

(52) U.S. Cl.
CPC ............. *G02B 7/09* (2013.01); *G02B 7/10* (2013.01); *G02B 7/102* (2013.01)

(58) Field of Classification Search
CPC . G02B 7/102; G02B 7/08; G02B 7/10; G02B 13/009; G02B 15/14; G02B 27/646; G02B 15/173; G02B 7/09; G02B 13/0065; G02B 7/021; G02B 15/16; G02B 15/177; G02B 7/005; G02B 7/022; G02B 13/0075; G02B 7/023; G02B 7/04; G02B 7/38; G02B 13/005; G02B 13/0085; G02B 13/0095; G02B 13/22; G02B 15/00; G02B 17/026; G02B 21/0012; G02B 23/2438; G02B 26/004; G02B 26/0833; G02B 26/0858; G02B 26/0875; G02B 27/0012; G02B 27/60; G02B 3/14; G02B 5/04; G02B 7/00; G02B 7/02; G02B 7/025; G02B 7/026; G02B 7/028; G02B 7/1805; G02B 7/282; G02B 7/36; H04N 5/23296; H04N 5/2254; H04N 5/23212; H04N 5/23203;
(Continued)

(56) References Cited

U.S. PATENT DOCUMENTS 4,917,846 A * 4/1990 Takase ............... B29C 33/52
                                                                   249/59
5,907,724 A * 5/1999 Uno ..................... G02B 7/102
                                                                   396/72
(Continued)

FOREIGN PATENT DOCUMENTS

JP    2003131111 A    5/2003
JP    2015026062 A    2/2015

*Primary Examiner* — Collin X Beatty
*Assistant Examiner* — Grant A Gagnon
(74) *Attorney, Agent, or Firm* — Rossi, Kimms & McDowell LLP

(57) ABSTRACT

A lens barrel includes a holding cylinder configured to hold an optical system, a cam cylinder, and a driving unit. At least part of each of the plurality of rotating members except the first rotating member is located inside an inner diameter of the cam cylinder and on an object side of an end of the cam cylinder on an image pickup surface side. The second rotating member is located closest to the object among the plurality of rotating members except the first rotating member, and on a rotating direction side of the cam cylinder where the cam cylinder moves to the object side relative to the first rotating member.

10 Claims, 6 Drawing Sheets

(58) Field of Classification Search
CPC .......... H04N 5/23209; H04N 2101/00; H04N
5/2251; H04N 5/2252; H04N 5/23258;
H04N 5/23287; H04N 2201/0084; H04N
5/2253; H04N 5/2257; H04N 5/232;
H04N 5/23238; H04N 5/2328; H04N
9/317; H04N 9/3182; H04N 9/3194;
G03B 3/10; G03B 5/00; G03B 17/04;
G03B 17/14; G03B 2205/0046; G03B
13/36; G03B 2205/0007; G03B
2205/0053; G03B 2205/0069; G03B
29/00; G03B 5/02; G03B 13/34; G03B
17/12; G03B 17/565; G03B 17/568;
G03B 21/142; G03B 21/53; G03B
2205/0061; G03B 2205/0084; G03B
2205/0092; G03B 2206/00; G03B
2217/005; G03B 31/00; G03B 9/02;
G03B 9/06; G03B 9/22
USPC ........................................................ 359/696
See application file for complete search history.

(56) References Cited

U.S. PATENT DOCUMENTS

| | | | |
|---|---|---|---|
| 6,707,993 B1 * | 3/2004 | Mitani ................... | G02B 7/102 |
| | | | 359/696 |
| 9,134,589 B2 | 9/2015 | Ito | |
| 2007/0024988 A1 * | 2/2007 | Tsuji ..................... | G02B 7/102 |
| | | | 359/694 |
| 2012/0105712 A1 * | 5/2012 | Terahara ................ | G02B 7/021 |
| | | | 348/360 |
| 2013/0100540 A1 | 4/2013 | Koga | |
| 2017/0153412 A1 * | 6/2017 | Ohmori ................. | G02B 5/005 |

\* cited by examiner

LENS BARREL

BACKGROUND OF THE INVENTION

Field of the Invention

The present invention relates to a lens barrel.

Description of the Related Art

A lens barrel has conventionally been known in which a lens unit (optical system) is moved along an optical axis as a driver, such as a motor and a speed reducer, rotationally drives a cam cylinder. Japanese Patent Laid-Open No. ("JP") 2015-26062 discloses a configuration that arranges a cam cylinder and a driver along an optical axis so as to miniaturize a lens barrel in a radial direction.

However, JP 2015-26062 arranges the cam cylinder and the driver along the optical axis. Therefore, the cam cylinder in the optical axis direction is shorter than that where the cam cylinder and the driver are not arranged in the optical axis. As the cam cylinder becomes shorter in the optical axis direction, the cam groove becomes shorter used to move the lens unit and the lens unit has a short moving distance in the optical direction or a short focal length. One solution for this problem is to make longer the cam groove, but makes longer the cam cylinder in the optical direction and makes larger the lens barrel in the optical axis direction.

SUMMARY OF THE INVENTION

The present invention provides a lens barrel that can maintain the focal length and be small in the optical axis direction.

A lens barrel according to one aspect of the present invention includes a holding cylinder configured to hold an optical system that guides light from an object to an image pickup surface, a cam cylinder configured to move the holding cylinder along an optical axis when the cam cylinder rotates around the optical axis in the optical system and moves along the optical axis, and a driving unit that includes a plurality of rotating member that include a first rotating member engaged with the cam cylinder so as to rotate the cam cylinder, and a second rotating member located at a position different from that of the first rotating member. At least part of each of the plurality of rotating members except the first rotating member is located inside an inner diameter of the cam cylinder and on an object side of an end of the cam cylinder on an image pickup surface side. The second rotating member is located closest to the object among the plurality of rotating members except the first rotating member, and on a rotating direction side of the cam cylinder where the cam cylinder moves to the object side relative to the first rotating member.

Further features of the present invention will become apparent from the following description of exemplary embodiments with reference to the attached drawings.

DESCRIPTION OF THE EMBODIMENTS

Figure 1:
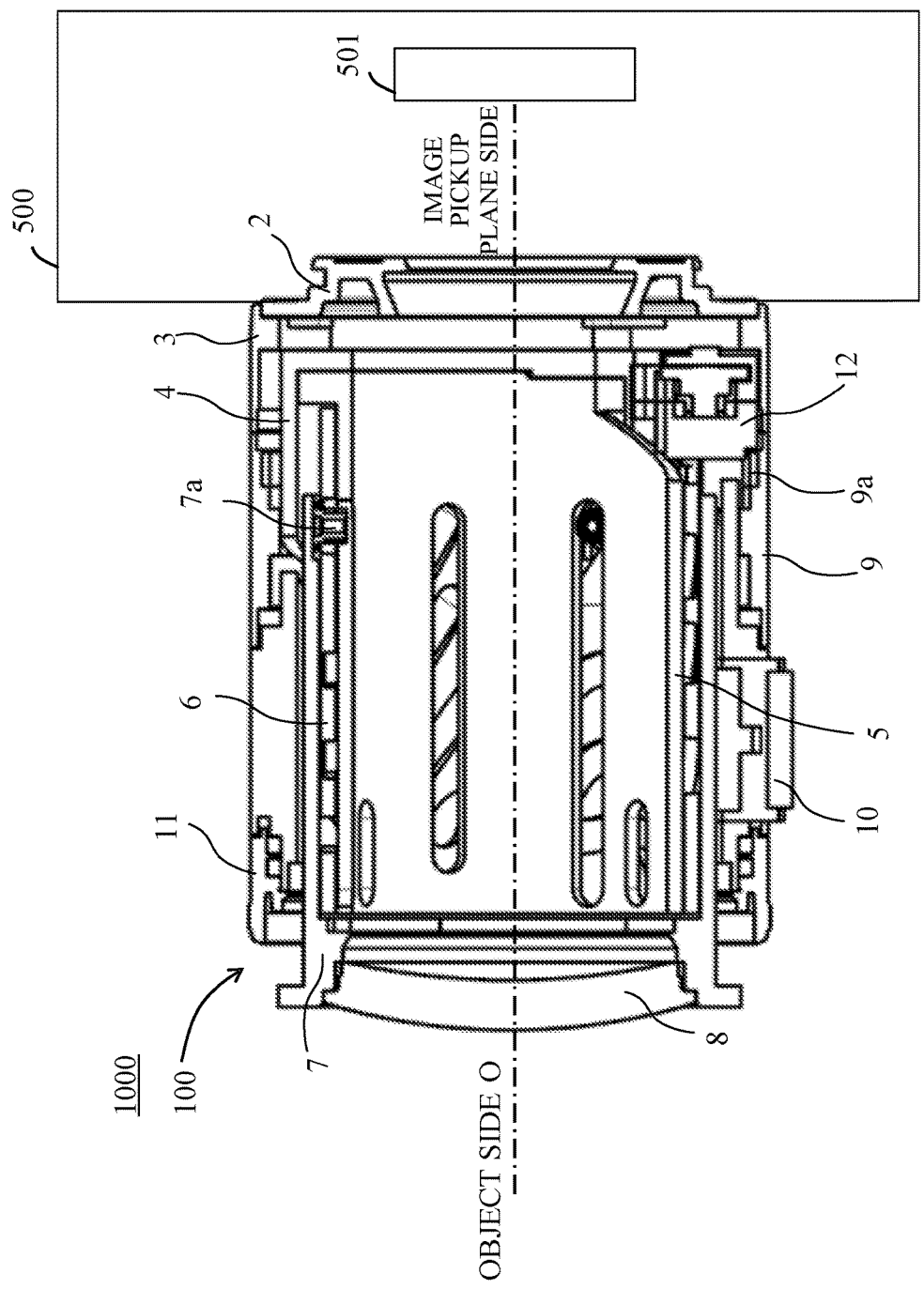
FIG. 1 is a sectional view of an image pickup apparatus that includes a lens barrel according to a first embodiment.

A detailed description will now be given of embodiments of the present invention with reference to the accompanying drawings. In each drawing, the same element will be designated by the same reference numeral, and a description thereof will be omitted. A lens barrel according to the present invention is applicable to an image pickup apparatus, such as a digital single-lens reflex camera, a digital camera, and a monitoring camera.

First Embodiment

[Configuration and Operation of Lens Barrel]

Figure 2:
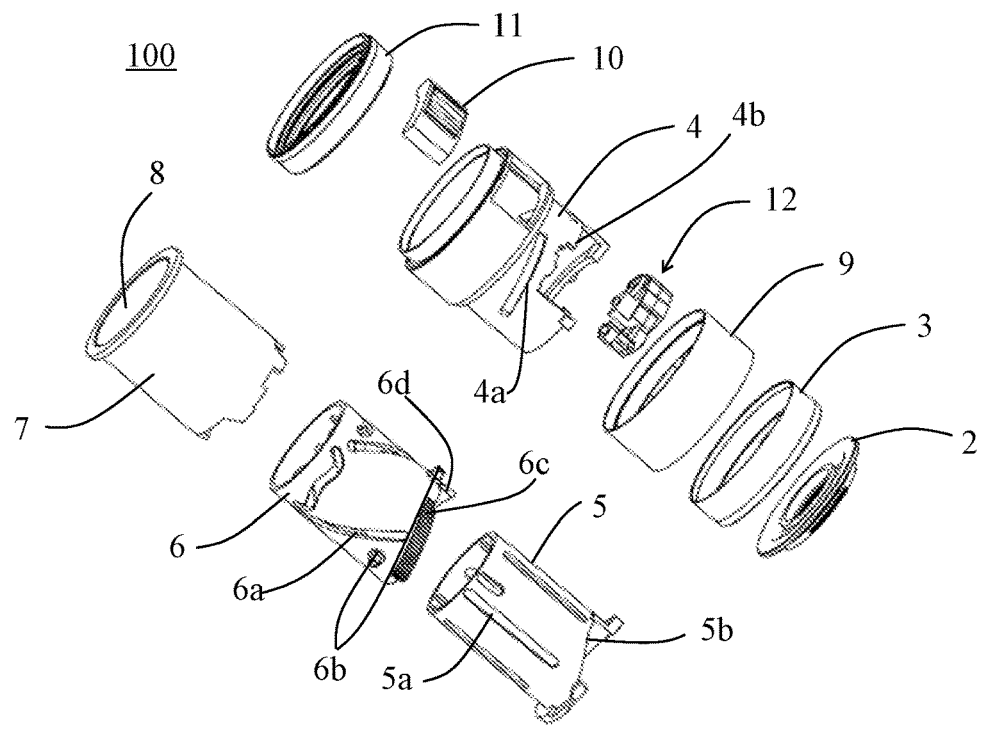
FIG. 2 is an exploded perspective view of the lens barrel according to the first embodiment.

A description will now be given of a configuration of a lens barrel 100 with reference to FIGS. 1 and 2. FIG. 1 is a sectional view of an image pickup apparatus 1000 that includes the lens barrel 100. FIG. 2 is an exploded perspective view of the lens barrel 100.

The lens barrel 100 is detachably attached to a camera body 500. The camera body 500 includes an image pickup element 501 that receives light from an object.

A lens mount 2 includes a bayonet unit used to mount the lens barrel 100 onto the camera body 500.

An exterior cylinder 3 is a built-in cover member on the lens barrel 100, and is fixed between the lens mount 2 and a fixing cylinder 4.

The fixing cylinder 4 is screwed onto the lens mount 2. The fixing cylinder 4 has three cam grooves 4a arranged at regular intervals of 120° in the circumferential direction. The cam groove 4a moves a cam-cylinder cam follower 6b along the optical axis O. The fixing cylinder 4 has a fixing-cylinder notch 4b used to avoid interference with a gear unit 12.

A guide cylinder 5 is screwed onto the fixing cylinder 4. The guide cylinder 5 has three linear guide grooves 5a that extend in the optical axis O direction and are arranged at regular intervals of 120° in the circumferential direction. The linear guide groove 5a linearly guides a first-lens-unit cam follower 7a. The guide cylinder 5 has a guide-cylinder notch 5b used to avoid the interference with the gear unit 12.

This embodiment forms the cam grooves 4a in the fixing cylinder 4, but may form them in the guide cylinder 5.

A cam cylinder 6 is supported rotatably around the optical axis O and movably in the optical axis O. The cam cylinder 6 has three cam grooves 6a arranged at regular intervals of 120° in the circumferential direction. The cam groove 6a moves the first-lens-unit cam follower 7a along the optical axis O. The three cam-cylinder cam followers 6b arranged at regular intervals of 120° in the circumferential direction are screwed onto the cam cylinder 6. The cam-cylinder cam followers 6b are slidably engaged with the cam grooves 4a formed in the fixing cylinder 4. The cam cylinder 6 has a gear tooth 6c engaged with the following cam-cylinder drive gear 20 (first rotating member). Moreover, the cam cylinder 6 has a cam-cylinder notch 6d used to avoid the interference with the gear unit 12.

A first-lens-unit holding cylinder 7 holds a first lens unit 8. The three first-lens-unit cam followers 7a arranged at regular intervals of 120° in the circumferential direction are screwed on the first-lens-unit holding cylinder 7. The first-lens-unit cam follower 7a is slidably engaged with the linear guide groove 5a formed in the guide cylinder 5. In addition, the first-lens-unit cam followers 7a are slidably engaged with the cam grooves 6a formed in the cam cylinder 6.

The first lens unit 8 is one of lens units in the optical system configured to image light from the object onto an image pickup surface (or plane) on the image pickup element 501. The optical system includes a lens unit such as a focus lens unit and an image stabilization lens unit in addition to the first lens unit 8.

A zoom ring (operating member) 9 is held on the fixing cylinder 4 rotatably around the optical axis O and restricted from moving in the optical axis O direction. The zoom ring 9 is rotated around the optical axis O by a manual operation of a user, and serves as an input unit in the manual zooming operation. An unillustrated annular flat spring forces the zoom ring 9 in the optical axis O direction relative to the fixing cylinder 4, and thus receives a predetermined torque is applied. In addition, a gear tooth 9a engaged with a gear tooth 22b of the following zoom-ring input gear (third rotating member) 22 is formed on the inner circumference of the zoom ring 9.

A motorized zoom switch 10 is fixed onto the fixing cylinder 4. The motorized zoom switch 10 outputs a zoom control signal in response to an operation by the user, and serves as an input unit in the motorized zooming operation. A zoom control signal is converted into a digital signal, and then input into an unillustrated driving-apparatus microcomputer in the lens barrel 100. The driving-apparatus microcomputer controls driving of the following motor 13 in accordance with the input zoom control signal. While this embodiment provides the motorized zoom switch 10 to the lens barrel 100, the camera body 500 may include it. A remote-controllable zoom switch, such as a remote controller, may serve as an input unit used for the motorized zooming operation.

A focus ring 11 is held on the fixing cylinder 4 so that it can rotate around the optical axis O and be restricted from moving in the optical axis O direction. The focus ring 11 is rotated around the optical axis O by the manual operation of the user, and serves as an input unit in a manual focusing operation. When the photographer manually rotates the focus ring 11 around the optical axis O, the unillustrated focus lens unit moves in the optical axis O direction for focusing.

The gear unit 12 includes a plurality of rotating members, such as the motor 13 and a plurality of gears, and serves as a driving unit configured to provide a rotating force to the cam cylinder 6 or to rotatably drive the cam cylinder 6. The gear unit 12 is housed in a spaced formed by the cam-cylinder notch 6d in the cam cylinder 6, and screwed onto the fixing cylinder 4.

Next follows a description of an operation of the lens barrel 100. When the gear unit 12 applies the rotating force to the cam cylinder 6, the cam cylinder rotates. As the cam cylinder 6 rotates, the cam-cylinder cam followers 6b are guided by the cam grooves 4a, and the cam cylinder 6 moves back and forth along the optical axis O. In other words, the cam cylinder 6 rotates around the optical axis O and moves back and forth along the optical axis O. As intersections between the linear guide grooves 5a and the cam grooves 6a move, the first-lens-unit holding cylinder 7 moves back and forth along the optical axis O via the first-lens-unit cam followers 7a. Since then first-lens-unit holding cylinder 7 holds the first lens unit 8, the first lens unit 8 moves back and forth along the optical axis O as the cam cylinder 6 rotates. A moving amount of the first lens unit 8 in the optical axis O direction is made by adding a moving amount of the cam cylinder 6 in the optical axis O direction and a moving amount of the first-lens-unit cam follower 7a in the optical axis O direction to each other.

[Configuration and Operation of the Gear Unit]

Figure 3:
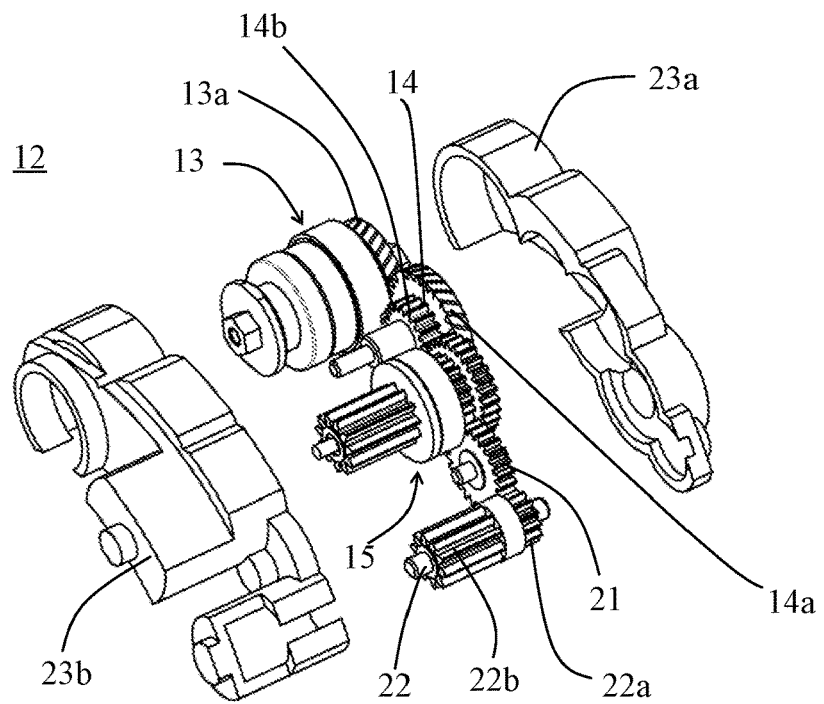
FIG. 3 is an exploded perspective view of a gear unit according to the first embodiment.
Figure 4:
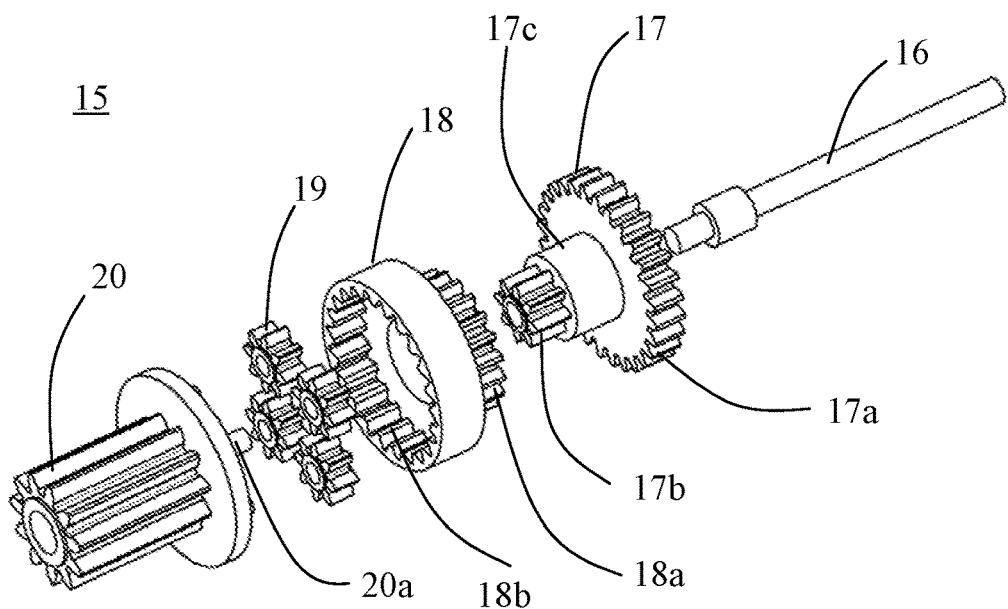
FIG. 4 is an exploded perspective view of a planetary gear mechanism according to the first embodiment.

Referring now to FIGS. 3 and 4, a description will be given of the configuration of the gear unit 12. FIG. 3 is an exploded perspective view of the gear unit 12. FIG. 4 is an exploded perspective view of a planetary gear mechanism 15. The gear unit 12 includes the motor 13, a transmitting gear 14, the planetary gear mechanism 15, a transmitting gear 21, and the zoom-ring input gear 22. The planetary gear mechanism 15 includes a shaft 16, a sun gear 17, a ring gear 18, four planetary gears 19, and a cam-cylinder drive gear 20.

The motor 13 is an ultrasonic motor, and rotates a rotor by converting the electric energy into the mechanical energy utilizing a laminated piezoelectric element. The motor 13 includes a motor gear 13a engaged with the rotor. When the voltage is applied to the motor 13, the motor gear 13a rotates as the rotor rotates.

The transmitting gear 14 includes gear teeth 14a and 14b. The gear teeth 14a and 14b are engaged with the motor gear 13a and a gear tooth 17a in the sun gear 17, respectively. In other words, the transmitting gear 14 transmits the rotating force of the motor gear 13a to the sun gear 17.

The shaft 16 serves as a rotating axis for the sun gear 17 and the cam-cylinder drive gear 20.

The sun gear 17 is pivotally supported by the shaft 16, and includes the gear teeth 17a and 17b. The gear teeth 17a and 17b are engaged with the transmitting gear 14 and the four planetary gears 19, respectively.

The ring gear 18 is pivotally supported by a shaft 17c in the sun gear 17, and includes gear teeth 18a and 18b. The gear teeth 18a and 18b are engaged with the transmitting gear 21 and four planetary gears 19, respectively.

The four planetary gears 19 are pivotally supported by four shafts 20a in the cam-cylinder drive gear 20, and engaged with both of the gear tooth 17b in the sun gear 17 and the gear tooth 18b in the ring gear 18. Each of the four planetary gears 19 rotates around pivotally supported shaft 20a and revolves around the sun gear 17.

The cam-cylinder drive gear 20 includes four shafts 20a that support the four planetary gears 19, and rotates around the shaft 16 as the planetary gears 19 revolve.

The transmitting gear 21 is engaged with both of the gear tooth 18a in the ring gear 18 and the gear tooth 22a in the zoom-ring input gear 22. Hence, the transmitting gear 21 transmits the rotating force of the zoom-ring input gear 22 to the ring gear 18.

The zoom-ring input gear 22 includes gear teeth 22a and 22b. The gear teeth 22a and 22b are engaged with the transmitting gear 21 and the gear tooth 9a of the zoom ring 9, respectively.

Gear cases 23a and 23b house the motor 13 and each gear, and serve as unillustrated bearings engageable with the shaft of each gear.

Next follows a description of an operation of the gear unit 12. Where the user operates the motorized zoom switch 10, the voltage is applied to the motor 13 and the motor gear 13a rotates. The rotating force of the motor gear 13a is transmitted to the sun gear 17 via the transmitting gear 14. The rotating force of the sun gear 17 is transmitted to the four planetary gears 19, and the four planetary gears 19 revolve around the sun gear 17. When the four planetary gears 19 revolve, the rotating force is transmitted to the cam-cylinder drive gear 20. At this time, since the predetermined torque is added to the zoom ring 9 and the zoom ring 9 stops, the ring gear 18 stops. The rotating force of the cam-cylinder drive gear 20 is transmitted to the cam cylinder 6, and the cam cylinder 6 rotates.

On the other hand, where the user manually rotates the zoom ring 9, the rotating force is transmitted to the zoom-ring input gear 22. The rotating force of the zoom-ring input gear 22 is transmitted to the ring gear 18 via the transmitting gear 21. The rotating force of the ring gear 18 is transmitted to the four planetary gears 19, and the four planetary gears 19 revolve around the sun gear 17. As the planetary gears 19 revolve, the rotating force is transmitted to the cam-cylinder drive gear 20. At this time, since the motor 13 is stopped by the holding torque caused by the friction, the sun gear 17 stops. The rotating force of the cam-cylinder drive gear 20 is transmitted to the cam cylinder 6, and the cam cylinder 6 rotates.

As described above, the lens barrel 100 can rotate the cam cylinder 6 both manually and electrically, without requiring any switches.

[Arrangement of the Motor and Gears]

Figure 5:
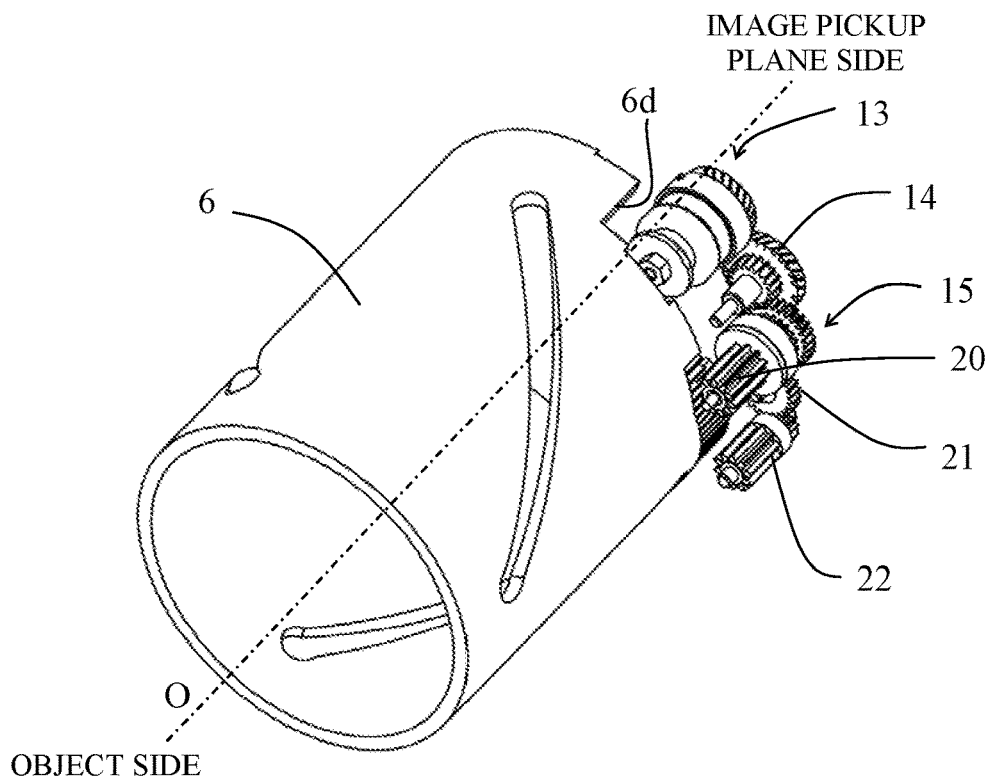
FIG. 5 is a perspective view of a lens barrel where a cam cylinder and the gear unit according to the first embodiment are illustrated.
Figure 6:
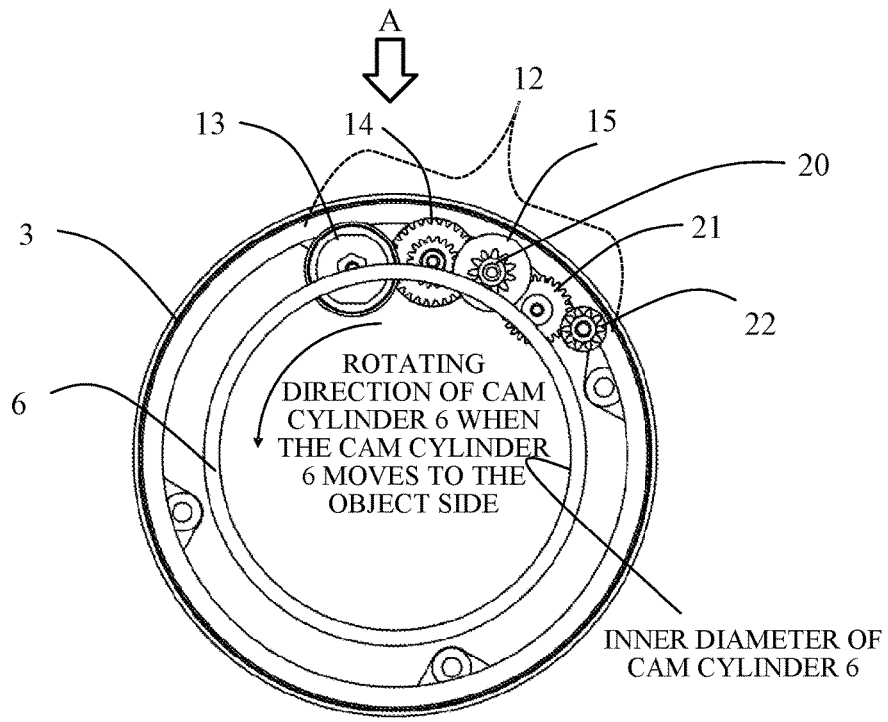
FIG. 6 is a front view of the lens barrel where the cam cylinder, an exterior cylinder, and a gear unit according to the first embodiment are illustrated.
Figure 7:
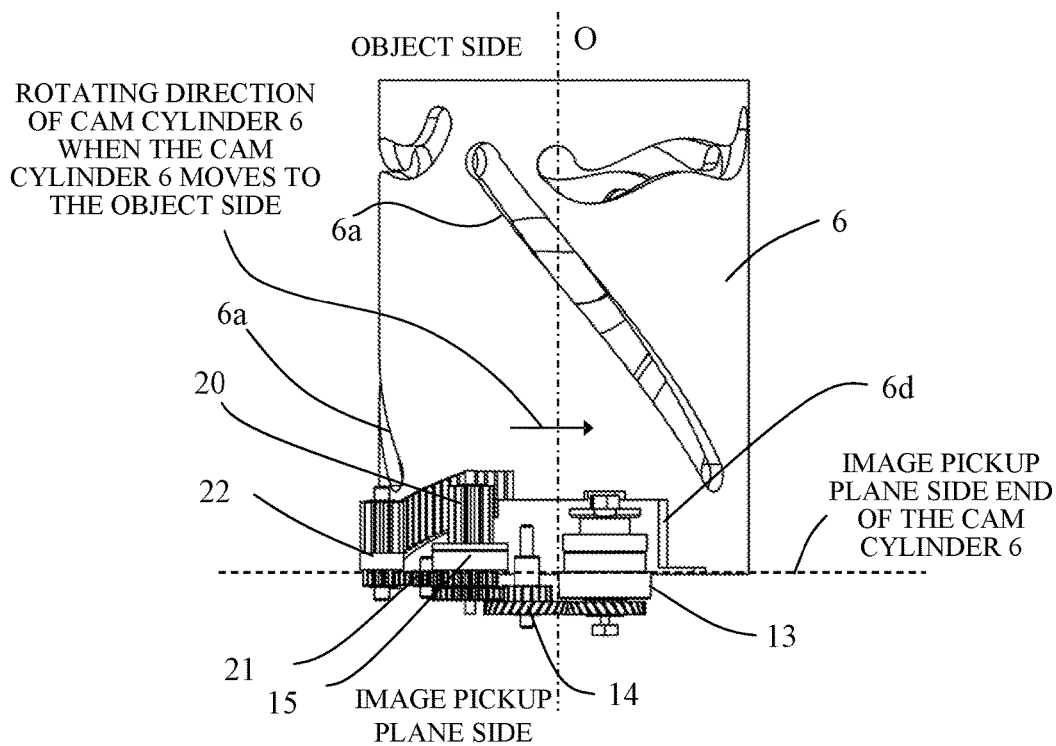
FIG. 7 is a side view of a lens barrel where the cam cylinder and the gear unit according to the first embodiment are illustrated.

Referring now to FIGS. 5 to 7, a description will be given of an arrangement of the motor 13 and each gear in the gear unit 12. FIG. 5 is a perspective view of the lens barrel 100 where the cam cylinder 6 and the gear unit 12 are illustrated. FIG. 6 is a front view of the lens barrel 100 viewed from the optical axis O direction where the cam cylinder 6, the exterior cylinder 3, and the gear unit 12 are illustrated. FIG. 7 is a side view of the lens barrel 100 viewed from an arrow A direction (as a direction orthogonal to the optical axis O) in FIG. 6 where the cam cylinder 6 and the gear unit 12 are illustrated.

As illustrated in FIG. 6, the gear unit 12 is located so that at least part of it is disposed inside the lens barrel 100 relative to the inner diameter of the cam barrel 6. Thereby, the lens barrel 100 is made smaller in the radial direction.

As illustrated in FIG. 7, the gear unit 12 is located so that at least part of it is positioned on the object side of the image pickup surface side end of the cam cylinder 6 in the optical axis O direction. Thereby, the lens barrel 100 is made smaller in the optical axis O direction.

The rotating member (second rotating member) in the gear unit 12, at least part of which is disposed inside the cam cylinder 6, and which is located closest to the object side among the rotating members except the cam-cylinder drive gear 20 (first rotating member) is positioned as follows. Namely, the second rotating member is disposed on the rotating direction side of the cam cylinder 6 moving to the object side relative to the cam-cylinder drive gear 20.

That at least part is positioned inside the inner diameter of the cam cylinder 6 means that at least part overlaps the cam cylinder 6 viewed from the optical axis direction as illustrated in FIG. 6. The position closest to the object means the projection closest to the object. This embodiment sets the cam-cylinder drive gear 20 to the first rotating member, but may set the planetary gear mechanism 15 having the cam-cylinder drive gear 20 to the first rotating member. In this embodiment, the zoom-ring input gear 22 is located outside the inner diameter of the cam cylinder 6, but may be located inside the inner diameter.

In this embodiment, as illustrated in FIG. 6, at least part of the rotating member that is located inside of the inner diameter of the cam cylinder 6, except the planetary gear mechanism 15 including the cam-cylinder drive gear 20, includes the motor 13, and the transmitting gears 14 and 21. The rotating member (second rotating member) closest to the object among these rotating members is the motor 13. Hence, the motor 13 is disposed, as illustrated in FIG. 7, on the rotating direction side of the cam cylinder 6 moving to the object side relative to the cam-cylinder drive gear 20. Thereby, the space for the cam gear 6a can be secured without making longer the cam cylinder 6 in the object axis O direction. In other words, this embodiment can maintain the focal length and provide a miniaturization in the optical axis O direction.

Even when the cam groove 6a is formed so as to reverse the rotating direction of the cam cylinder 6 moving to the object side, the effects of the present invention can be obtained by disposing the second rotating member on the rotating direction side of the cam cylinder 6 where the second rotating member is moved to the object side relative to the cam-cylinder drive gear 20.

Figure 8:
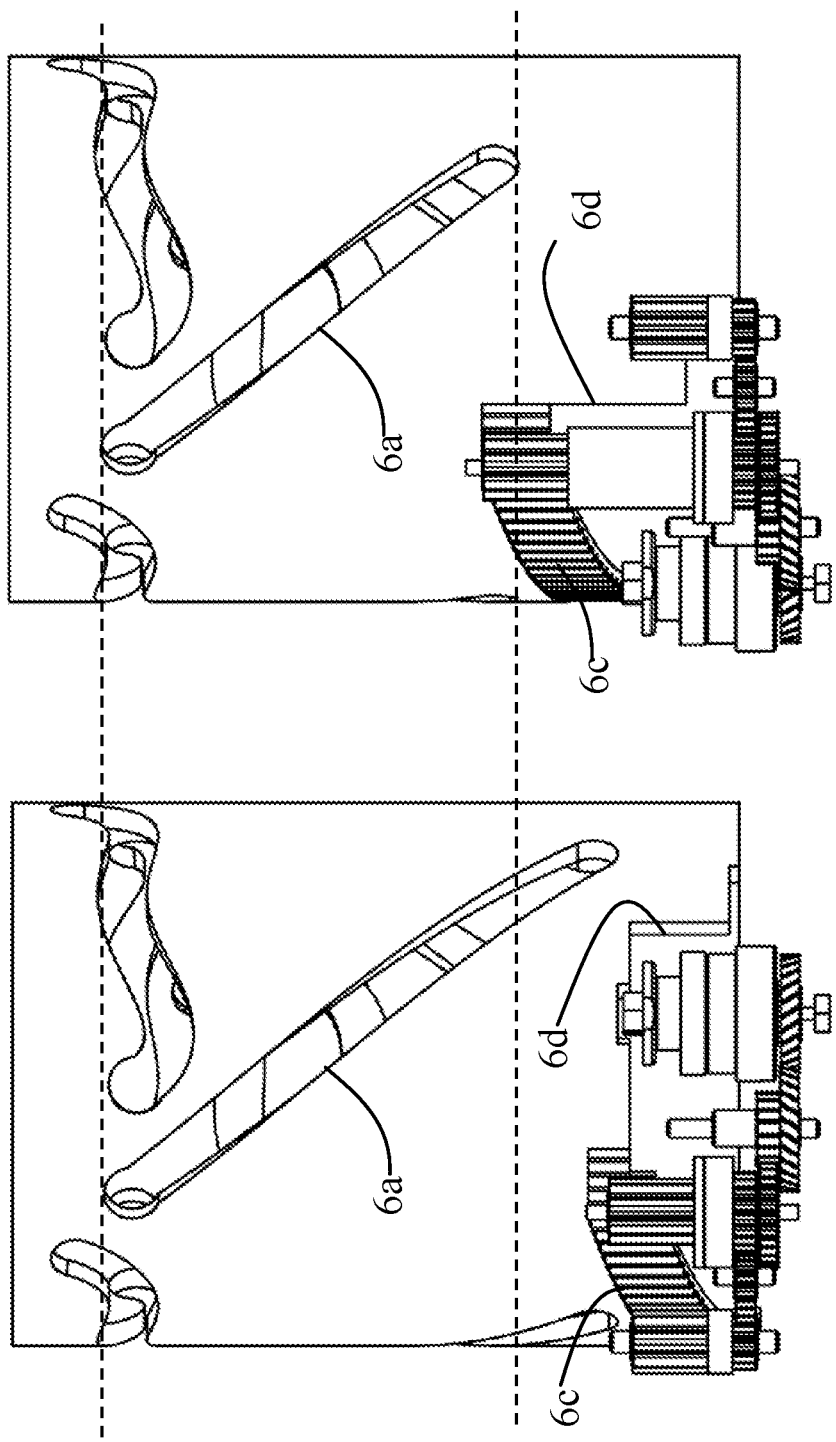
FIGS. 8A and 8B are explanatory views of an arrangement of rotating members in the gear unit.

FIGS. 8A and 8B are explanatory views of the arrangement of the rotating members in the gear unit 12. In FIGS. 8A and 8B, the motor 13 is the rotating member, at least part of which is disposed inside the inner diameter of the cam cylinder 6, and one of rotating members except for the first rotating member, which is located closest to the object side. FIG. 8A illustrates the motor 13 disposed on the rotating direction side of the cam cylinder 6 moving to the object side relative to the cam-cylinder drive gear 20. FIG. 8B illustrates the motor 13 disposed on the rotating direction side of the cam cylinder 6 moving to the image pickup surface side relative to the cam-cylinder drive gear 20. The cam-cylinder notch 6d illustrated in FIG. 8A in the optical axis direction is shorter than that in FIG. 8B. Hence, FIG. 8A can secure a wider space for the cam groove 6a than that in FIG. 8B. In other words, the cam groove 6a can be made longer in the optical axis direction. On the other hand, in FIG. 8B, the gear tooth 6c extends in the optical axis direction further than that in FIG. 8A. As described above, the moving amount of the first lens unit 8 in the optical axis direction is made by adding the moving amount of the cam cylinder 6 in the optical axis direction and the moving amount of the first-lens-unit cam follower 7a in the optical axis direction to each other. Since the moving amount of the first lens unit 8 in the optical axis direction little changes between FIG. 8A and FIG. 8B, the focal length is prevented from reducing in any cases. However, a moving amount of the cam cylinder 6 becomes longer in the optical axis direction in FIG. 8B, and thus the outer circumference of the cam cylinder 6 may not be covered with the focus ring 11 when the cam cylinder 6 moves to the object side in FIG. 8B. In order to cover the outer circumference of the cam cylinder 6, it is necessary to enlarge the focus ring 11 or to prepare another member.

The cam groove configured to move the unillustrated lens unit along the optical axis is formed in the inner circumference of the cam cylinder 6. In FIG. 8B, the position for forming the cam groove is separated from the center of gravity of the image pickup apparatus 1000, and thus the lens unit may significantly oscillate when the shutter closes.

As described above, the lens barrel 100 according to this embodiment restrains the focal length from reducing and enables the miniaturization in the optical axis direction.

Second Embodiment

Figure 9:
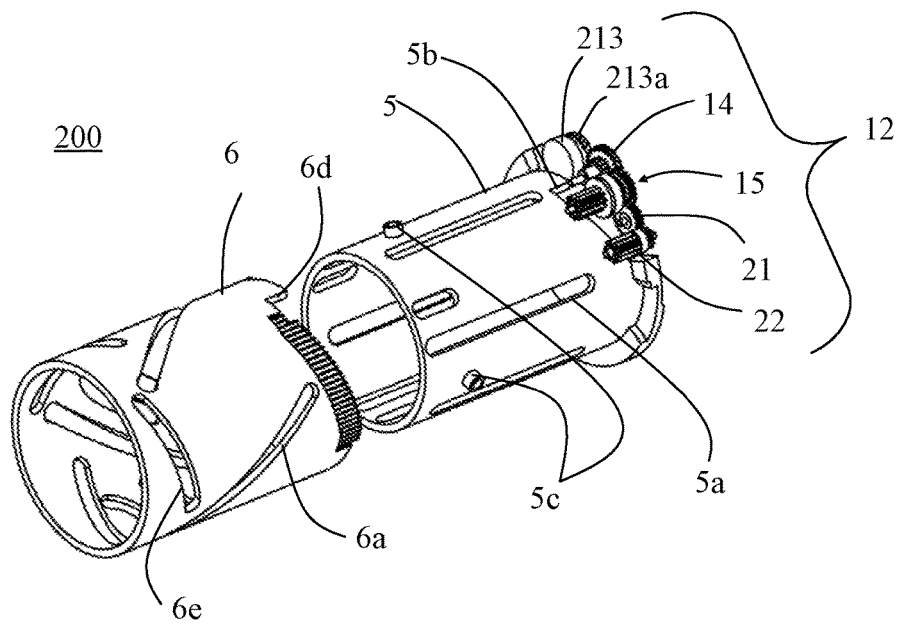
FIG. 9 is an explanatory perspective view of a lens barrel where a cam barrel, a guide cylinder and a gear according to a second embodiment are illustrated.
Figure 10:
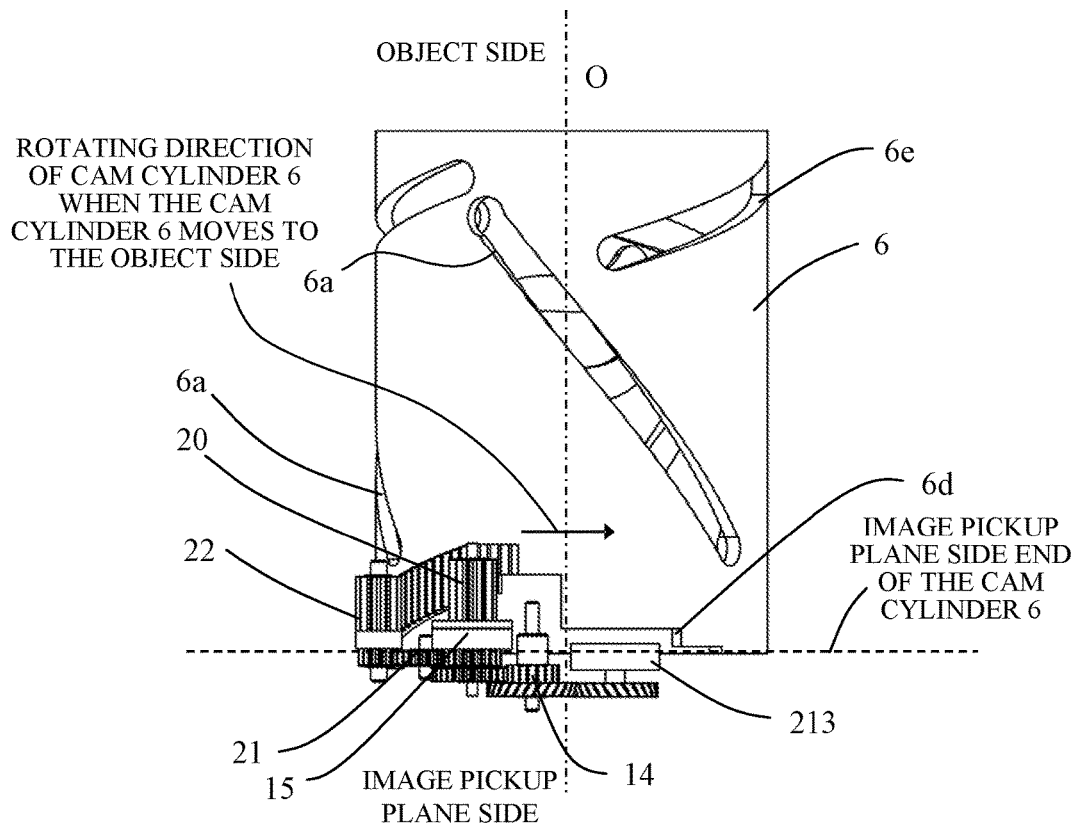
FIG. 10 is a side view of a lens barrel where the cam cylinder and the gear unit according to the second embodiment are illustrated.

Referring now to FIGS. 9 and 10, a description will be given of the lens barrel 200 according to this embodiment. FIG. 9 is an exploded perspective view of the lens barrel 200 where the cam cylinder 6, the guide cylinder 5, and the gear unit 12 are illustrated. FIG. 10 is a side view of the lens barrel 200 in a direction orthogonal to the optical axis O where the cam cylinder 6 and the gear cylinder are illustrated. This embodiment describes the configuration different from that in the first embodiment, assigns the same reference numeral to the same element in the first embodiment, and omits a duplicate description thereof.

[Configuration and Operation of Lens Barrel]

A description will now be given of the configuration of the lens barrel 200. The cam cylinder has a cam groove 6e configured to move the cam cylinder 6 along the optical axis O. A guide-cylinder cam follower 5c engaged with the cam groove 6e is screwed on the guide cylinder 5.

Next follows a description of an operation of the lens barrel 200. When the gear unit 12 provides the rotating force to the cam cylinder 6, the cam cylinder 6 rotates. As the cam cylinder 6 rotates, the guide-cylinder cam follower 5c is guided by the cam groove 6e and the cam cylinder 6 moves back and forth along the optical axis O. In other words, the cam cylinder 6 moves along the optical axis O while rotating around the optical axis O. As an intersection between the linear guide groove 5a and the cam groove 6a moves, the first lens unit 8 moves along the optical axis O. The moving amount of the first lens unit 8 in the optical axis O direction is made by adding the moving amount of the cam cylinder 6 in the optical axis O direction and the moving amount of the first-lens-unit cam follower 7a in the optical axis O direction to each other.

[Configuration and Operation of Gear Unit]

The gear unit 12 includes a motor 213 as an electromagnetic direct current ("DC") motor. The motor 213 includes a motor gear 213a engaged with an unillustrated magnet rotor. As the voltage is applied to the motor 213, the motor gear 213a rotates as the magnet rotor rotates. As the motor 213 rotates, the cam cylinder 6 rotates due to the mechanism similar to that in the first embodiment.

[Arrangement of Motor and Gears]

Similar to the first embodiment, the gear unit 12 is disposed so that at least part of it is positioned inside the lens barrel 200 relative to the inner diameter of the cam cylinder 6. Thereby, the lens barrel 200 is made smaller in the radial direction.

As illustrated in FIG. 10, the gear unit 12 is arranged so that at least part of it is positioned on the object side of the image pickup surface side end of the cam cylinder 6 in the optical axis O direction. Thereby, the lens barrel 200 is made smaller in the optical axis O direction.

A rotating member (second rotating member) in the gear unit 12, at least part of which is disposed inside the inner diameter of the cam cylinder 6 and which is located closest to the object side among the rotating members except for the cam-cylinder drive gear 20 (the first rotating member) is disposed as follows. In other words, the second rotating member is disposed on the rotating direction side of the cam cylinder 6 moving to the object side relative to the cam-cylinder drive gear 20. In this embodiment, the rotating member, at least part of which is positioned inside the inner diameter of the cam cylinder 6, except the planetary gear mechanism 15 including the cam-cylinder drive gear 20, includes the motor 213, and the transmitting gears 14 and 21. The transmitting gear 14 is the rotating member (second rotating member) located closest to the object among these rotating members. This embodiment sets the cam-cylinder drive gear 20 to the first rotating member, but may set the planetary gear mechanism 15 including the cam-cylinder drive gear 20 to the first rotating member. Thereby, as illustrated in FIG. 10, the transmitting gear 14 is disposed on the rotating direction side of the cam cylinder 6 moving to the object side relative to the cam-cylinder drive gear 20. Thereby, the space for the cam groove 6a can be secured without making longer the cam cylinder 6 in the optical axis O. In other words, this configuration can restrain the focal length from reducing and enable a miniaturization in the optical axis O direction.

Even when the cam groove 6a is formed so as to reverse the rotating direction of the cam cylinder 6 moving to the object side, the effects of the present invention can be obtained when the second rotating member is disposed on the rotating direction side of the cam cylinder 6 moving to the object side relative to the cam-cylinder drive gear 20.

As discussed above, the lens barrel 200 according to this embodiment can maintain the focal length and provide a miniaturization in the optical axis direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2016-248675, filed Dec. 22, 2016, which is hereby incorporated by reference herein in its entirety.

What is claimed is:

1. A lens barrel comprising:
a holding cylinder configured to hold an optical system that guides light from an object to an image pickup surface;
a cam cylinder configured to move the holding cylinder along an optical axis of the optical system when the cam cylinder rotates around the optical axis and moves along the optical axis; and
a driving unit including a plurality of rotating members that include a first rotating member engaged with the cam cylinder so as to rotate the cam cylinder and a second rotating member located at a position different from that of the first rotating member,
wherein at least part of the driving unit except the first rotating member is located inside an inner diameter of the cam cylinder and on an object side of an end of the cam cylinder on an image pickup surface side,
wherein a plurality of predetermined rotating members among the plurality of rotating members except the first rotating member are located so that at least part of each of the plurality of predetermined rotating members is located inside the inner diameter of the cam cylinder, and
wherein the second rotating member is located closest to the object among the plurality of predetermined rotating members, and on a rotating direction side of the cam cylinder moving where the cam cylinder moves to the object side relative to the first rotating member.

2. The lens barrel according to claim 1, wherein the second rotating member is a motor.

3. The lens barrel according to claim 1, wherein the first rotating member is connected to the second rotating member via a planetary gear mechanism.

4. The lens barrel according to claim 1, further comprising an operating member configured to be manually and rotationally operable,
wherein the plurality of rotating members includes a third rotating member configured to transmit a rotating force to the first rotating member in a case where the operating member is rotationally operated.

5. The lens barrel according to claim 4, wherein the third rotating member is located outside the inner diameter of the cam cylinder.

6. The lens barrel according to claim 4, wherein the first rotating member is connected to the third rotating member via a planetary gear mechanism.

7. The lens barrel according to claim 4, wherein the first rotating member is located between the second rotating member and the third rotating member.

8. The lens barrel according to claim 4, wherein the first rotating member is connected to the second rotating member and the third rotating member via a planetary gear mechanism.

9. The lens barrel according to claim 8, wherein a predetermined torque is applied to the operating member.

10. An image pickup apparatus comprising:
a lens barrel; and
an image pickup element that includes an image pickup surface configured to receive light from an object,
wherein the lens barrel includes:
    a holding cylinder configured to hold an optical system that guides light from an object to an image pickup surface;
    a cam cylinder configured to move the holding cylinder along an optical axis of the optical system when the cam cylinder rotates around the optical axis and moves along the optical axis; and
    a driving unit including a plurality of rotating members that include a first rotating member engaged with the cam cylinder so as to rotate the cam cylinder and a second rotating member located at a position different from that of the first rotating member,
wherein at least part of the driving unit except the first rotating member is located inside an inner diameter of the cam cylinder and on an object side of an end of the cam cylinder on an image pickup surface side,
wherein a plurality of predetermined rotating members among the plurality of rotating members except the first rotating member are located so that at least part of each of the plurality of predetermined rotating members is located inside the inner diameter of the cam cylinder, and
wherein the second rotating member is located closest to the object among the plurality of predetermined rotating members, and on a rotating direction side of the cam cylinder moving where the cam cylinder moves to the object side relative to the first rotating member.

* * * * *